United States Patent [19]

Williams

[11] 4,016,080
[45] Apr. 5, 1977

[54] FLUID FILTER AND PURIFYING APPARATUS

[76] Inventor: Douglas J. Williams, 25569 Langston St., Valencia, Calif. 91355

[22] Filed: Aug. 14, 1975

[21] Appl. No.: 604,884

[52] U.S. Cl. .............................. 210/284; 210/315; 210/317; 210/501; 210/502; 55/316; 55/387
[51] Int. Cl.² ........................................ B01D 23/10
[58] Field of Search .................... 55/316, 320, 387; 210/501, 502, 503, 504, 505, 284, 315, 317

[56] References Cited
UNITED STATES PATENTS

| | | | |
|---|---|---|---|
| 3,313,309 | 4/1967 | Wang | 55/316 |
| 3,327,859 | 6/1967 | Pall | 210/501 UX |
| 3,406,501 | 10/1968 | Watkins | 55/316 |
| 3,872,013 | 3/1975 | Nishino et al. | 210/510 X |

Primary Examiner—Frank A. Spear, Jr.
Assistant Examiner—E. Rollins Cross
Attorney, Agent, or Firm—Poms, Smith, Lande & Glenny

[57] ABSTRACT

A fluid filter and purifying apparatus located within a supportive structure wherein substantially all of the fluid passing therethrough is caused to be conducted through two separate mediums, a stranded fibrous medium in order to remove particulate matter and activated carbon in order to remove chemical pollutants. The granulated carbon is located within a plurality of elongated envelopes with a preferential oval cross-section. Each of the envelopes are mounted within the frame in a spaced apart manner forming a gap between adjacent envelopes. The major axis of each oval shaped envelope is inclined at an acute angle, preferably 45°, with respect to the direction of fluid flow. Located within each gap may be a quantity of stranded glass fibers which is to remove particulate matter from the fluid.

8 Claims, 5 Drawing Figures

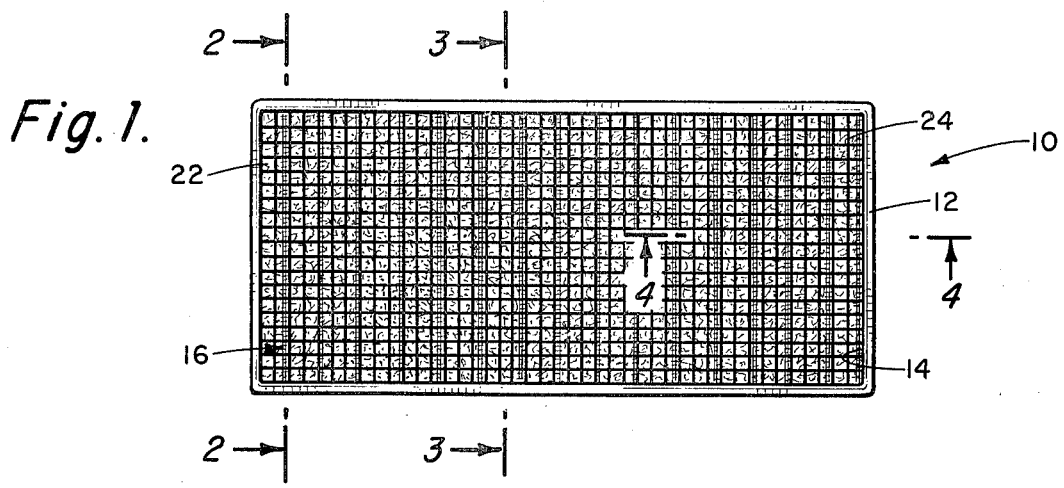
Fig. 1.
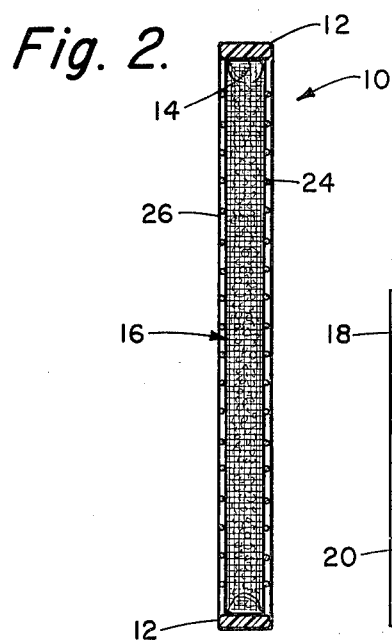
Fig. 2.
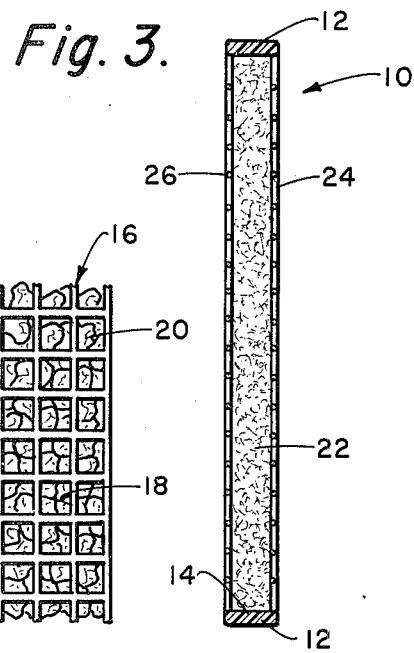
Fig. 3.
Fig. 5.
Fig. 4.
AIR FLOW

FLUID FILTER AND PURIFYING APPARATUS

BACKGROUND OF THE INVENTION

The field of this invention relates to fluid filters and more particular to a filter which is primarily designed to remove particulate matter and chemical pollutants from water, air, or other gaseous mediums.

The ultimate performance goal for any filter is to remove one hundred percent of all particulate matter and to remove one hundred percent of all chemical pollutants without restricting the flow through the filter. In the past, in order to remove substantially all of the particulate matter and chemical pollutants, filters have highly restricted the flow. On the other hand, if the filter mechanism was designed to be substantially non-restrictive of the flow, it has been found that only a relatively small amount of the particulate matter or chemical pollutants were removed, since there has been no forced contact of the flow with the filter medias (without significant restriction of the flow itself).

Also in the past, most filters for these applications were designed primarily to remove particulate matter and if it was desirable to remove chemical pollutants from the air, an additional separate filter was employed. The mere fact of moving the air flow through two separate filters doubled the restriction of the air flow. A single filter employing both filtering media is less restrictive than two different filters.

Therefore, it would be desirable to design a combined particle filter and purifying filter which removes a substantial percentage of both chemical pollutants and particulate matter from a fluid flow with a minimum amount of restriction of the flow.

SUMMARY OF THE INVENTION

The filter of this invention is designed primarily to be a disposable filter using the combination of activated carbon adsorbent and glass fiber media. Activated carbon granules are enclosed in a plurality of air permeable envelopes, the major cross-sectional axis of each envelope is inclined with respect to the direction of the flow through the filter. The envelopes are placed in a spaced apart manner so as to form a gap between adjacent envelopes. The glass fiber media in the form of a mass of stranded glass fibers is placed within each gap or as a layer above or below the envelopes, or any combination of the above. The glass fibers may be coated with a bactericide and/or a chemical dust collector.

The advantages of the structure of this invention are many, some of which are as follows: It can be manufactured at low cost. Is extremely efficient in filtration of certain objectionable particulate containing gaseous substances, such as smoke, dust, and smog. It presents low resistance to the air flow while providing high effectiveness of filtration. It can be used in high velocity as well as low velocity flows, and is readily positionable in conventional air ducts replacing already existing filter structures. It can be readily changed to accommodate any application, adsorbent quantity or back pressure requirements. Considerable flexibility is designed into the invention to allow various adjustments in location/quantity of A.C. or fibrous media to facilitate adaptation to various applications.

BRIEF DESCRIPTION OF THE DRAWING

FIG. 1 is a front view of the filtering apparatus of this invention seen from the direction of entering flow;

FIG. 2 is a cross-sectional view taken along line 2—2 of FIG. 1 showing only the exterior of an envelope;

FIG. 3 is a cross-sectional view taken along line 3—3 of FIG. 1 showing only the fibrous material;

FIG. 4 is an enlarged cross-sectional view taken along line 4—4 of FIG. 1; and

FIG. 5 is a front view of one of the charcoal granule containing envelopes located within the filter structure of this invention taken along line 5—5 of FIG. 4.

DETAILED DESCRIPTION OF THE SHOWN EMBODIMENT

Referring particularly to the drawing, there is shown in FIG. 1 the filter 10 of this invention which has about its periphery thereof a rigid frame 12. The filter 10 is shown to be of a rectangular shape. However, it is considered to be within the scope of this invention that the filter could be in any shape, such as circular, square, octagonal, and triangular. The frame 12 is shown to be constructed of a rigid, plastic material. However, it is considered to be within the scope of this invention that the frame 12 could be any rigid material, such as wood, metal, or the like. In certain applications, the frame may be non-existant since internal filter structures may serve as the supportive structure.

The frame 12 encloses an area 14. Within the area 14 is located a plurality of elongated envelopes 16. Each envelope 16 is formed of a plastic material. However, the envelope 16 could be constructed of another rigid material, if desired, for example, screen, hardware cloth or fabric. Further, it is considered within the scope of this invention that the supportive structure could be constructed as an internal support, such as plastic fibers, with no further external envelope mechanism used; or the combination of the above.

An envelope 16 is defined as basic shape enclosed or not enclosed. For example, the envelope 16 could take the form of a mass of fibers to which are attached granules of activated carbon, the mass assuming the envelope shape.

Each envelope 16 includes a plurality of spaced openings 18. In referring to FIG. 5 of the drawing, the openings 18 are shown to be square, but the openings could be any design, such as round, if preferred. Each of the envelopes 16 is shown to be of oval or ellipsoidal in cross-section. The height of the cross-section can be termed the major axis with the width being termed the minor axis. The cross-section is shown in its preferred embodiment. It is considered within the scope of this invention that this cross-section could be of any desired shape, such as round, square or rectangular.

Located within each envelope 16 is a quantity of activated carbon granules 20. The preferred shapes is granulated, however, it is to be considered that solid carbon rods could be employed. The longitudinal axis of each envelope forms a line and when located within the area 14, these longitudinal axes are preferably parallel (but may be arranged in a non-parallel relationship). The major axis for each envelope is inclined with respect to the flow of fluid. The preferable inclination is forty-five degrees. However, it is considered to be within the scope of this invention that the major axis of each envelope could be placed at another angle, rather than forty-five degrees.

In normal practice, the downstream end of one of the envelopes will be in substantial direct alignment (in the direction of the flow) with the upstream end of the next adjacent envelope. This means as the flow is caused to pass through the area 14 that each molecule of the flow will be caused to pass through one of the envelopes 16 and therefore each molecule of the flow will come into contact with the activated carbon located within the envelope. Although this is the preferable location of each of the envelopes, it is considered to be within the scope of this invention to place the envelopes closer to each other, or in a more spread apart manner.

The envelopes 16 are to be attached by any conventional, permanent fastening means to the frame 12. The attachment may take the form of some type of fastener or some type of adhesive, or the envelopes 16 may be formed integrally with the frame 12. Also, the envelopes 16 may be detached from the frame 12 and supported in another manner, such as being attached to the open mesh screening to be described.

Located between each of the envelopes 16 is a gap and within the gap is located a quantity of stranded fibers 22. The preferable type of fiber would be a glass fiber. However, it is considered to be within the scope of this invention that other type of fibers could be employed. It may be preferable to coat the fibrous material in order to facilitate the adhering of particulate matter to the fibers. Also, a coating may be applied to the fibrous material in the form of a bactericide which would function to destroy any bacteria located within the flow passing therethrough.

It is also to be noted that as the air passes through the area 14 that each molecule of air will also come into contact with the fibers 22. The fibers 22 may be just loosely packed within each gap.

The front end of the filter 10 is closed by an open mesh screen 24, with the backside of the filter 10 being closed by an open mesh screen 26. The use of the open mesh screens 24 and 26 minimally restrict passage of the flow through the area 14.

It is considered feasible that in some embodiments of filter construction of this invention that the envelopes 16 may be mounted in an adjustable manner with respect to the frame. This adjustment may be preferred to be more restrictive in some applications and in such instance that the envelopes would be closer together and in other applications the envelopes would be spread apart so as to be minimally restrictive, or the angle between the direction of flow and A.C. may be varied to accomplish the same end results.

Also, it is considered to be within the scope of this invention that the porosity of the activated carbon granules 20 will be pre-determined prior to constructing of the filter and for certain installations, a certain type of porosity will be preferred. The porosity may be varied by size, shape or density of the A.C. It is also considered to be within the scope of this invention that because of the minimal restrictiveness of the flow of the filter of this invention that the filters of this invention can be readily stacked or placed in consecutive special arrangement.

The filter of this invention has extremely low resistance to the air flow because of the open mesh screenings 24 and 26, the inclination of the envelopes to the direction of air flow, the oval design of each of the envelopes, the permeability of each of the envelopes and a readily passing of the air through the glass fibers.

Although the filter of this invention is designed primarily to be used in conjunction with air, it is considered to be within the scope of this invention that the structure could be used to filter a liquid, such as water, or other gases and/or liquids, or any combination of these.

What is claimed is:

1. A fluid filter and purifying apparatus comprising:
a supportive structure;
a plurality of elongated envelopes, each said envelope terminating in a first end and a second end, each said envelope having a longitudinal axis, said envelopes connected to said supportive structure, said envelopes being spaced from each other forming a gap between adjacent envelopes, each said envelope being positioned to be inclined with respect to the direction of the fluid flow through said supportive structure, each said envelope being adapted to retain a quantity of granulated carbon, each said gap being adapted to contain a quantity of loosely packed fibrous material; and
an open mesh screening placed across said supportive structures and attached to both the front side and the back side of said supportive structure, thereby sandwiching therebetween said carbon containing envelope and said fibrous material.

2. The apparatus as defined in claim 1 wherein:
said supportive structure being continuous forming an enclosed area.

3. The apparatus as defined in claim 2 wherein:
each said longitudinal axis of said envelopes being a straight line.

4. The apparatus as defined in claim 1 wherein:
each said envelope in cross-section being substantially in the shape of an ellipse with said width comprising the minor axis of the ellipse and said height comprising the major axis of said ellipse, said major axis of each said envelope being inclined at an acute angle to the direction of fluid flow, said height of each said envelope being substantially greater than said width.

5. The apparatus as defined in claim 4 wherein:
the screening attached to one of said sides defines a plane and
said inclination and spacing of said envelopes is such that a line perpendicular to said plane intersecting an end of one of said envelopes intersects an adjacent one of said envelopes.

6. The apparatus as defined in claim 5 wherein:
each of said gaps being equal in size.

7. The apparatus as defined in claim 6 wherein:
said fibrous material comprising a mass of stranded glass fibers positioned within each of said gaps.

8. The apparatus as defined in claim 7 wherein:
each of said fibers within said stranded glass fibers being treated with a bactericide.

* * * * *